United States Patent Office 3,206,477
Patented Sept. 14, 1965

3,206,477
METHOD OF MANUFACTURING α-HYDROXY-CARBOXYLIC ACIDS
Takeyoshi Haga, Tokyo, Japan, assignor to Mitsubishi Chemical Industries Limited, Tokyo, Japan, a corporation of Japan
No Drawing. Filed Aug. 17, 1961, Ser. No. 131,994
Claims priority, application Japan, Aug. 24, 1960, 35,473/60
11 Claims. (Cl. 260—343.6)

This invention relates to method of manufacturing α-hydroxy-carboxylic acids. Particularly, this invention relates to method of manufacturing α-hydroxy-glutaric acid or the substituted compounds represented in the form of free acid by the Formula 1 as follows:

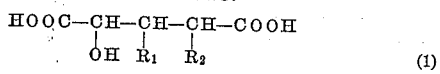

$$\text{HOOC—CH—CH—CH—COOH} \atop {\phantom{\text{HOOC—}}\text{OH} \phantom{\text{—}} \text{R}_1 \phantom{\text{—}} \text{R}_2} \quad (1)$$

wherein $R_1$ and $R_2$ denotes, respectively, one selected from the group consisting of hydrogen atom, alkyl-, aryl-, aralkyl-radical and a substituted radical thereof.

An object of this invention is to provide a novel method of manufacturing the above-mentioned α-hydroxy-carboxylic acid, which is useful as an intermediate of various useful organic chemicals. Another object of the invention is to produce economically these α-hydroxy-carboxylic acids. Other objects will be illustrated in the following description.

The above-mentioned objects are attained according to my invention by reacting a α-hydroxy-carboxylic acid represented by the following general Formula 2:

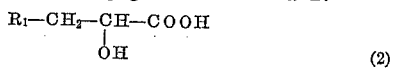

$$\text{R}_1\text{—CH}_2\text{—CH—COOH} \atop {\phantom{\text{R}_1\text{—CH}_2\text{—}}\text{OH}} \quad (2)$$

wherein $R_1$ denotes the same $R_1$ as denoted in the Formula 1 with a α-hydroxy-carboxylic acid represented by the following general Formula 3:

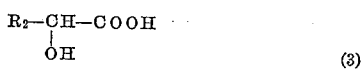

$$\text{R}_2\text{—CH—COOH} \atop {\phantom{\text{R}_2\text{—}}\text{OH}} \quad (3)$$

wherein $R_2$ denotes the same $R_2$ as denoted in the above Formula 1 in the presence of at least one of alkali compounds and at least one selected from the group consisting of oxide and hydroxide of metals having a valence not less than 2.

I discovered in my previous studies that α-hydroxy-glutaric acid or substituted compounds thereof are produced by dehydration reaction of a α-hydroxy-carboxylic acid of the above Formula 2 with a α-hydroxy-carboxylic acid of the above Formula 3 in the presence of an alkali compound at an elevated temperature. The dehydration reaction is represented as follows:

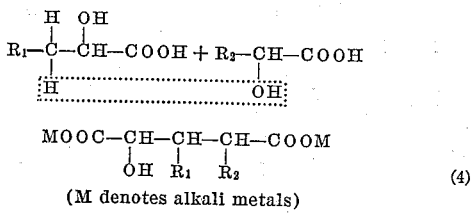

$$\text{R}_1\text{—C—CH—COOH} + \text{R}_2\text{—CH—COOH} \atop {\phantom{\text{R}_1\text{—}}\text{H} \phantom{\text{—CH—COOH}} \text{OH} \phantom{\text{—CH—COOH}}}$$

$$\downarrow$$

$$\text{MOOC—CH—CH—CH—COOM} \atop {\phantom{\text{MOOC—}}\text{OH} \phantom{\text{—}} \text{R}_1 \phantom{\text{—}} \text{R}_2} \quad (4)$$

(M denotes alkali metals)

In the course of my further studies, I have discovered that the above-mentioned reaction takes place very smoothly in the presence of at least one oxide or hydroxide of metals having a valence of two or more valence.

As the compounds to be applied to the invention which are represented by the Formula 2, there are cited various α-hydroxy carboxylic acids having three or more carbon atoms. These may be, for example, α-hydroxy-aliphatic carboxylic acids or substituents thereof such as α-hydroxy propionic acid (lactic acid), α-hydroxy-butyric acid, α-hydroxy valeric acid, α-hydroxy-caproic acid, α-hydroxy-caprylic acid, α-hydroxy-capric acid, α-hydroxy-lauric acid, γ-carboxy-α-hydroxy butyric acid, α-hydroxy-β-phenyl propionic acid, α-hydroxy-γ-phenyl-butyric acid and α-hydroxy-γ-tolyl-butyric acid.

As the compounds represented by the Formula 3 which may be applied to the invention, there are cited various α-hydroxy carboxylic acids having two or more carbon atoms which may be, for example, glycolic acid, mandelic acid, and other α-hydroxy carboxylic acids which have been quoted in the foregoing as concrete examples of the compounds of the Formula 2. The compounds of the Formula 2 may be the same as the compounds of the Formula 3.

The present invention is concerned with a method for performing reactions in which different kinds or the same kind of above-mentioned α-hydroxy-carboxylic acids take part.

The first requisite for performing the method of the invention is that the reaction is carried out in the presence of an alkali compound. As the alkali compounds, caustic alkalis such as potassium hydroxide and sodium hydroxide are especially preferable. Also alkali carbonates such as potassium carbonate and sodium carbonate may be used. The quantity of these alkali compounds to be employed ranges as usual from about 1.01 to 1.2 mols each for carboxyl radicals contained in the hydroxy-carboxylic acid used as starting material. However, more quantity of the alkali compound may be employed.

The second requisite for performing the method according to the invention is that the reaction takes place in the presence of at least one hydroxide or oxide of metals having a valence of two or more valency. These compounds act as a catalytic compound in the reaction of the present method. As the catalytic compounds there may be adduced, for example, hydroxide or oxide of a metal such as zinc, iron, chromium, tin, magnesium, calcium, manganese, cobalt, nickel, copper, cadmium, and barium. Especially, hydroxide or oxide of zinc, iron, chromium and tin is preferred because of their high catalytic activity. In applying to the present method these compounds may be employed individually or as a mixture of two or more. According to the invention, it is feasible either to employ pre-manufactured hydroxide or oxide of the above-mentioned metals or to allow the hydroxide or oxide of these metals to form in the course of the reaction. In the latter case, a metal salt such as chloride, nitrate, and sulfate of above-mentioned metals is added to the reaction system in order to permit the metal salt to react in the reaction system with coexisting alkali compound to form a corresponding metal oxide or hydroxide. The suitable quantity of these catalytic compounds to be added may be broadly varied in accordance with the respective activity. For example, hydroxide or oxide having high activity such as that of zinc, iron, chromium, and tin may be used usually up to about 5% by weight of the reaction material. On the other hand, much more is needed for a reaction material such as hydroxide or oxide of magnesium or calcium which is of lower activity. The reaction in the method is performed at elevated temperatures. Suitable reaction temperatures may be selected in accordance with the kind of reaction materials and of the above-mentioned catalytic compounds. In general, a temperature ranging from 170° to 250° C. is suitable for the reaction. For example, in the case where a starting material of high reactivity such as lactic acid and glycolic acid is employed the reaction takes place at 200° C. or below even if the catalyst employed for the reaction is comparatively low in activity. However, in the case where a starting material of comparatively low reactivity such as α-hydroxy-lauric acid is employed, it is desirable to complete the reaction in the presence of a catalyst of high activity in a shorter length of time at a temperature not lower than 200° C. A supplemental addition of a small amount of nickel powder or copper powder to the reaction system of the present method is effective in promoting the reaction.

The α-hydroxy-glutaric acids and substituted compounds theerof are generally difficult to be separated from the reaction products obtained according to the invention by way of distillation. Hence the separation is effected preferably in the form of lactones or esters. These hydroxy-carboxylic acids are useful as an intermediate of various chemicals, medicines, and perfumes. For example, α-hydroxy-glutaric acid obtained according to the invention may be easily converted into valuable glutamic acid by treating with ammonia.

Some preferred embodiments of the invention will be described in detail wherein the examples given are for the purpose of illustrating preferred embodiments only and not for the purpose of limiting the same. The "part" in the following denotes the portion by weight unless otherwise specified.

*Example 1*

30 parts of potassium hydroxide and 0.5 part of zinc oxide are added to a mixture consisting of 27 parts of lactic acid of 75% purity and 25 parts of glycolic acid of 75% purity for converting both of lactic acid and glycolic acid into potassium salt while allowing an excess of hydroxide be in existence. The resultant mixture is subjected to heating at a temperature 190° to 199° C. while stirring for 10 hr. to obtain a sticky reaction product containing potassium α-hydroxy-glutarate. The resultant mass is dissolved in water followed by hydrochloric acid acidification, ethanol esterification and distillation. The yield is 26 parts of ethyl ester of butyrolactone-γ-carboxylic acid having a boiling point of 125°–130° C./5 mm. Hg and the following formula:

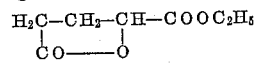

*Example 2*

A reaction product containing potassium α-hydroxy-glutarate is obtained by the use of 0.5 part of ferrous oxide in place of 0.5 part of zinc oxide in Example 1. The product is then acidified by hydrochloric acid followed by ethanol esterification and distillation as in Example 1 to obtain 25.5 parts of ethyl ester of butyrolactone-γ-carboxylic acid.

*Example 3*

A reaction product containing potassium α-hydroxy-glutarate is obtained by the use of 0.5 part of chromium oxide in place of 0.5 part of zinc oxide in Example 1. The product is then acidified by hydrochloric acid followed by ethanol esterification and distillation to obtain 24 parts of ethyl ester of butyrolactone-γ-carboxylic acid.

*Example 4*

A quantity of sodium hydroxide is added to a mixture consisting of 25 parts of lactic acid of 90% purity and 20 parts of glycolic acid of 70% purity for converting both of them into the sodium salts followed by a further addition of 3 parts of sodium hydroxide and 0.5 parts of zinc oxide, and heating under stirring at 210° to 220° C. for 7 hr. to obtain a reaction product containing sodium α-hydroxy-glutarate. The reaction product is then subjected to esterification with iso-butanol and distillation to obtain 11.0 parts of iso-butyl ester of butyrolactone-γ-carboxylic acid having boiling point of 120°–125° C./2.5 mm. Hg.

*Example 5*

A quantity of potassium hydroxide is added to a mixture consisting of 13 parts of α-hydroxy-butyric acid and 18 parts of glycolic acid for converting both of them into the potassium salts followed by a further addition of 2 parts of potassium hydroxide and 0.5 part of ferrous sulfate and heating while stirring at 210° to 215° C. for 7 hr. to obtain a reaction product containing potassium α-hydroxy-β-methyl-glutarate. The reaction product is then subjected to ethanol esterification and distillation to obtain 12.7 parts of ethyl ester of β-methyl-butyrolactone-γ-carboxylic acid having boiling point of 100° C./3 mm. Hg. and the following formula:

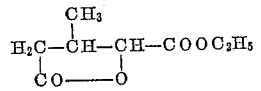

The analytical values of the product closely approximate to the calculated values as follows:

|  | C (percent) | H (percent) |
|---|---|---|
| Calcd. for C₈H₁₂O₄ | 55.81 | 7.03 |
| Found | 55.69 | 7.08 |

*Example 6*

A quantity of potassium hydroxide is added to a mixture consisting of 23 parts of α-hydroxy-valeric acid and 17 parts of gylcolic acid for converting both of these acids into the potassium salts followed by a further addition of 2 parts of potassium hydroxide and 0.5 part of ferrous sulfate. The resultant mixture is heated under stirring at 210° to 215° C. for 7 hrs. to obtain a reaction product containing potassium α-hydroxy-β-ethyl-glutarate. The product is then subjected to ethanol esterification and distillation to obtain 9 parts of ethyl ester of β-ethyl-butyrolactone-γ-carboxylic acid having a boiling point of 108°–109° C./3 mm. Hg and the following formula:

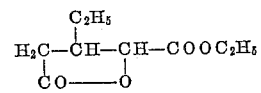

The analytical values of the product closely approximate to the calculated values as follows:

|  | C (percent) | H (percent) |
|---|---|---|
| Calcd. for C₉H₁₄O₄ | 58.05 | 7.58 |
| Found | 58.41 | 7.38 |

*Example 7*

A quantity of potassium hydroxide is added to 30 parts of lactic acid of 90% purity to convert the latter into the potassium salt followed by a further addition of 5 parts of potassium hydroxide and 0.5 part of zinc oxide. The resultant mixture is heated under stirring at 220° to 230° C. for 6 hrs. The reaction product thus obtained is dissolved in water followed by hydrochloric acid acidification and concentration. The resultant concentrate is subjected to esterification by adding 100 parts of ethanol and distillation. The fraction is further subjected to fractional distillation to obtain ethyl ester of α-methyl-butylrolactone-γ-carboxylic acid having a boiling point of 118–121° C./25 mm. Hg and the following formula:

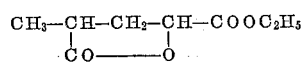

The analytical values of the product closely approximate to the calculated values as follows:

|  | C (percent) | H (percent) |
|---|---|---|
| Calcd. for C₈H₁₂O₄ | 55.80 | 7.02 |
| Found | 56.10 | 7.09 |

Example 8

70 parts of lactic acid is neutralized by an addition of potassium hydroxide as in Example 7 followed by a further addition of 10 parts of potassium hydroxide and 2 parts of ferrous sulfate. The resultant mixture is heated at 215° to 230° C. for 6 hrs. followed by ethanol esterification and distillation as in Example 7 to obtain 45 parts of ethyl ester of α-methyl-butylrolactone-γ-carboxylic acid having a boiling point of 110–125° C./25 mm. Hg. By treating this compound with hydrazine, dihydrazide of α-hydroxy-γ-methyl glutaric acid having melting point of 114–116° C. is obtained. The analytical values of the product closely approximate the calculated values as follows:

|  | C (percent) | H (percent) | N (percent) |
|---|---|---|---|
| Calcd. for $C_6H_{14}O_3N_4 \cdot H_2O$ | 34.61 | 7.75 | 26.91 |
| Found | 34.63 | 7.58 | 26.38 |

Similar results are obtained also in case where ferric sulfate or ferrous hydroxide or ferric hydroxide is used in place of ferrous sulfate of this example.

Example 9

40 parts of α-hydroxy-butyric acid are converted into the potassium salt by an addition of potassium hydroxide followed by a further addition of 5 parts of potassium hydroxide and 1 part of ferrous sulfate and heating at 215 to 220° C. for 7 hrs. The reaction product is subjected to ethanol esterification and distillation to obtain 20 parts of a fraction having boiling point of 108–114° C./3 mm. Hg. The analytical values of this product closely approximate the calculated values of ethyl ester of α-ethyl-β-methyl-butyrolactone-γ-carboxylic acid having the following formula:

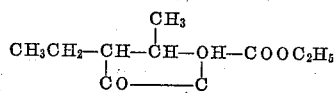

|  | C (percent) | H (percent) |
|---|---|---|
| Calcd. for $C_{10}H_{16}O_4$ | 59.99 | 8.06 |
| Found | 59.75 | 7.56 |

The infrared absorption spectrum of this product shows bands at 1782 cm.$^{-1}$ and 1740 cm.$^{-1}$, respectively, suggesting the presence of γ-lactone ring and ester of carboxylic acid.

Example 10

19 parts of α-hydroxy valeric acid is converted into the potassium salt by an addition of potassium hydroxide followed by a further addition of 3 parts of potassium hydroxide and 0.5 part of ferrous sulfate and heating at 220° C. for 7 hr. The reaction product is subjected to butanol esterification and distillation to obtain 10 parts of a fraction having a boiling point of 135–139° C./1.1 mm. Hg. The analytical values of this product closely approximate the calculated values of butyl ester of α-propyl-β-ethyl-butyrolactone-γ-carboxylic acid having the following formula:

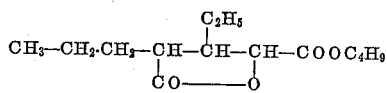

|  | C (percent) | H (percent) |
|---|---|---|
| Calcd. for $C_{14}H_{24}O_4$ | 65.01 | 9.44 |
| Found | 64.98 | 9.20 |

Example 11

A mixture consisting of 23 parts of α-hydroxy-valeric acid and 13 parts of lactic acid is converted into the potassium salts by an addition of a quantity of potassium hydroxide followed by a further addition of 2 parts of potassium hydroxide and 0.3 part of ferrous hydroxide and heating at 210 to 220° C. for 7 hr. The reaction produce is subjected to ethanol esterification and distillation to obtain 9 parts of a fraction having a boiling point of 118–121° C./25 mm. Hg. The analytical values of this product closely approximate the calculated values of ethyl ester of α-propyl-butyrolactone-γ-carboxylic acid having the following formula:

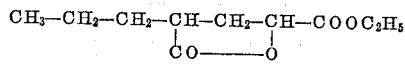

|  | C (percent) | H (percent) |
|---|---|---|
| Calcd. for $C_{10}H_{16}O_4$ | 59.99 | 8.06 |
| Found | 59.47 | 7.69 |

Example 12

A mixture consisting of 8.5 parts of mandelic acid and 7 parts of lactic acid is converted into the potassium salt by an addition of potassium hydroxide followed by a further addition of part 1 of potassium hydroxide and 0.2 part of ferrous sulfate and heating at 220 to 205° C. for 7 hr. The reaction product is subjected to ethanol esterification and subsequent distillation to obtain a fraction having a boiling point of 163–170° C./3 mm. Hg. In view of the analytical values of the product and the observation of infrared spectrum, this product is well presumed to be a mixture consisting of ethyl ester of α-phenyl-butyrolactone-γ-carboxylic acid (4) and diethyl ester of α-hydroxy-γ-phenyl-glutaric acid (5), the latter corresponding to ring-opened ethyl ester of α-phenyl-butyrolactone-γ-carboxylic acid (4). The formula of these are as follows:

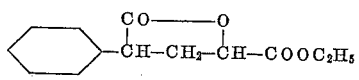

(4)

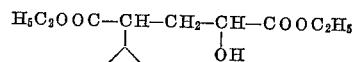

(5)

|  | C (percent) | H (percent) |
|---|---|---|
| Calcd. for formula (4) | 66.65 | 6.02 |
| Calcd. for formula (5) | 64.26 | 7.19 |
| Found | 65.25 | 5.88 |

Example 13

A mixture consisting of 100 parts of α-hydroxy-γ-phenyl-butyric acid and 50 parts of glycolic acid of 70% purity is converted into the potassium salt by an addition of potassium hydroxide followed by a further addition of 7 parts of potassium hydroxide and 1 part of zinc oxide, and heating at 200° C. for 1 hr. The reaction product is subjected to esterification with ethanol and subsequent distillation to obtain 30 parts of a fraction having a boiling point of 170–180° C./0.25 mm. Hg. The analytical values of this product closely approximate the calculated values of ethyl ester of β-benzyl-butyrolactone-γ-carboxylic acid having the following formula:

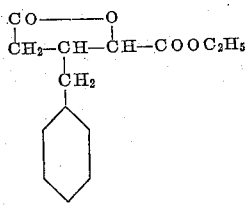

|  | C (percent) | H (percent) |
| --- | --- | --- |
| Calcd. for $C_{14}H_{16}O_4$ | 67.74 | 6.45 |
| Found | 67.58 | 6.57 |

I claim:
1. A method of manufacturing α-hydroxy-carboxylic acids in the form of their alkali metal salts and represented in the form of free acid by the general formula:

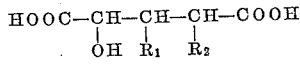

wherein $R_1$ and $R_2$ denote, respectively, a radical selected from the group consisting of hydrogen alkyl-, aryl- and aralkyl-radicals which comprises reacting α-hydroxy-carboxylic acid represented by the general formula:

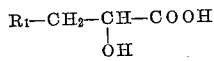

wherein $R_1$ is selected from the group consisting of hydrogen, alkyl-, aryl- and aralkyl-radicals with α-hydroxy-carboxylic acid represented by the general formula:

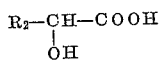

wherein $R_2$ is selected from the group consisting of hydrogen, alkyl-, aryl- and aralkyl-radicals, introducing an amount of an alkali metal compound taken from the class consisting of hydroxide and carbonate of more than 1 mol per carboxyl radical present, and at least one compound selected from the group consisting of hydroxide and oxide of zinc, iron, chromium, tin, magnesium, calcium, manganese, cobalt, nickel, copper, cadmium and barium, said mixture being substantially free from water, and maintaining a temperature above the boiling point of water and below the decomposition temperature of the reactants and products for a sufficient time to cause a reaction to take place.

2. A method according to claim 1 characterized in that said temperature is about 170° to 250° C.

3. A method according to claim 1 characterized in that there is present a promotor taken from the class consisting of copper and nickel.

4. A method according to claim 1 characterized in that the reaction product is reacted with a monohydric alcohol, and is separated from the reaction mass.

5. A method according to claim 4 characterized in that said separated product is distilled.

6. A method according to claim 1 characterized in that at least one of said reacting acids is lactic.

7. A method according to claim 1 characterized in that at leats one of said reacting acids is glycolic.

8. A method according to claim 1 characterized in that at least one of said reacting acids is hydroxy-butyric.

9. A method according to claim 1 characterized in that at least one of said reacting acids is hydroxy-valeric.

10. A method according to claim 1 characterized in that at least one of said reacting acids is mandelic.

11. A method according to claim 1 characterized in that at least one of said reacting acids is hydroxy-phenyl-butyric.

References Cited by the Examiner

Penn: High Polymeric Chemistry, pages 319 and 343–345 (1949).

Ringel: Chemical Abstracts (abstract of German Patent No. 14,812, June 7, 1958), vol. 53, page 10044 (1959).

LORRAINE A. WEINBERGER, Primary Examiner.

CHARLES B. PARKER, LEON ZITVER, Examiners.